UNITED STATES PATENT OFFICE.

BERNARD C. MOLLOY, OF LONDON, AND JOHN D. WARREN, OF SOUTH KENSINGTON, ENGLAND.

IMPROVEMENT IN RECOVERY OF WASTE NITROUS GASES.

Specification forming part of Letters Patent No. 198,776, dated January 1, 1878; application filed December 3, 1877.

*To all whom it may concern:*

Be it known that we, BERNARD CHARLES MOLLOY, of the Temple, in the city of London, England, barrister at law, and JOHN DAVIS WARREN, of South Kensington, in the county of Middlesex, England, scientist, have invented Improvements in the Method of Using and Producing Nitric Acid, of which the following is a specification:

The object of our said invention is to employ nitric acid in connection with apparatus that enables what would otherwise be waste products to be recovered, and thereby we economize quantities of nitric acid employed, in the usual manner, in various metallurgical and other operations wherein oxidizing processes are employed.

Our mode of procedure is to collect the fumes of the lower oxides of nitrogen arising from the decomposition of nitric acid, and, by treating them in the manner hereinafter described, again to form nitric acid capable of being used over again.

In carrying out the said invention the details of the process will vary with the purpose or purposes for which the nitric acid is used—such, for example, as the production of chlorine from hydrochloric acid, the oxidation of ores, and the like; but the following general arrangements for reoxidation, absorption, and reproduction of the nitric acid are adopted:

When nitric acid is used, in the ordinary way, for oxidizing various substances, it parts with a portion of its oxygen, and the remainder passes off as fumes or gases, being peroxide of nitrogen, nitrous acid, and nitric oxide, or one or more of these gases. These fumes represent the original nitric acid, less part of its oxygen and the water of the acid. In order to reconvert these fumes or gases into nitric acid, it is necessary, therefore, to replace the lost or used-up atoms of oxygen and the water. The former, in our process, we obtain from atmospheric air or from oxygen, and the latter from the spray, in the manner presently described.

The fumes or gases above referred to, as they escape from the oxidizing-tank, are conducted, through a pipe or other convenient conduit, into a tower or towers, there to be reoxidized and absorbed, as hereinafter described. These towers consist of closed chambers, which may be of any convenient size; but we prefer to make them about thirty feet in height and three feet in diameter. Their form and material may also be varied; but we construct them, by preference, of glazed earthenware pipes or slate, or such other material as will not be easily affected by acid. They are built up and jointed with sulphate of lime, (Paris plaster.) Each tower rests in a tank having a water-joint, into which the reconverted acid falls, and from which it may be drawn. Into the sides of the pipes forming the tower we fix a suitable number of, say two or three, glass bottles with ground stoppers, but with the bottoms cut out. These bottles may be fitted in and luted with sulphate of lime.

To the upper portion of the tower is or are fitted one or more jets, through which steam and water—preferably at about 100° centigrade—are forced, so as to be brought into contact. These jets, whether used separately or combined, are so arranged as to be capable of being easily and accurately adjusted, in order to cause a cloud or spray of very finely-divided water, of a temperature of, say, about 100° centigrade, to fall slowly through the tower or receptacle. Atmospheric air or oxygen is at the same time allowed to enter the tower or receptacle.

The construction of the jet may be varied; but it is so arranged that the quantity of air or oxygen, water, and steam can be regulated at will. The tower should, as is obvious, be made gas-tight.

When the fumes or gases coming from the nitric acid are evolved and enter the tower, an approximate estimate may be formed of the quantity by the depth of the color seen in the bottles fixed, or through glazed or equivalent openings made in the sides of the tower. When the tower is sufficiently charged, the jet comes into action. Steam and hot water are turned on into the jet, in such proportions and quantities as that the steam shall strike and separate the water into a minutely-divided spray, the steam itself being, to a very great extent, condensed in the hot water, so that the spray is a misty vapor of hot water slowly falling through the tower. In its descent the particles of the spray come in contact with the peroxide of nitrogen and the other oxides ($N_2O_3$ and $N_2O_2$) which may be present. The nitrous anhydride ($N_2O_3$) and nitric oxide ($N_2O_2$) are immediately oxidized by the air (admitted and drawn in through the air-tube of the jet or through the other air-holes) into peroxide of nitrogen, ($N_2O_4$,) thus: $N_2O_2+N_2O_3+3O=2N_2O_4$. This peroxide of nitrogen ($N_2O_4$) is quickly absorbed by the spray, and decomposed by it into nitric oxide and nitric acid. The nitric acid is dissolved by the hot water, and carried with it into the tank at the bottom of the tower, there to be collected. The nitric oxide remains undissolved by the spray, and becomes oxidized eventually by the air admitted into peroxide, which, in turn, becomes split up again into nitric oxide and nitric acid, the latter being collected, as before, in the tank. The reaction may be $6N_2O_4+4H_2O=2N_2O_2+8HNO_3$. Eventually, therefore, the lower oxides of nitrogen becoming oxidized by contact with air into the higher peroxide, and this, in turn, being absorbed by the spray and divided into nitric oxide and nitric acid, which is dissolved and carried down, and the reactions being successively continuous, the whole of the nitric acid, when operated on under perfect conditions, will be regained.

When necessary there may be two towers, connected at the top by means of a pipe. The egress into the second tower may be closed by a water-joint, (or other convenient means,) so that an excess of the fumes or gases in the first tower would, at a given pressure, pass through the water-joint into the second tower.

Where a large quantity of nitric acid is being used, or upon substances where evolution is sudden and rapid, then, to avoid any loss through forced leakage, we provide an escape-chamber, into which any fumes which may not have been absorbed, or any nitric acid which may have passed away as spray, may be conducted. We construct this chamber of glazed brick or slate, or other suitable material. It may be in the form of a chimney, at a slight incline, and with alternate baffle-plates or projections, so that the vapor and gases, if any, will pass up slowly from right to left, and then from left to right, and so on, following a zigzag course. The gases, if any, will be absorbed, as before described, by the vapor spray, which will, in turn, condense and flow back into a tank.

The size, form, and number of the towers, tanks, and their appurtenances will, of necessity, vary according to the work to be done. The towers should be gas-tight, and arranged as above indicated, so that no escape of fumes can take place, except as described. With moderate care and attention, practically there should be no loss whatever.

In order to give a further exemplification of our method of using and reproducing the nitric acid, we will describe an operation with auriferous iron pyrites. The pyrites, being well ground and roasted, are placed in a slate or other convenient tank. The nitric acid is added to the pyrites by simply turning a tap fixed in the foot of the tower; and to the nitric acid so introduced there is added hydrochloric acid sufficient for acting on the metal. The remaining oxidizable matter in the ore is oxidized, and the hydrochloric acid splits up and gives chlorine to combine with the gold, and with the silver, if any be present. The affinity of the chlorine for the metals is greatest when the chlorine, as in this case, is nascent.

The contents of the tank may be maintained in a heated state by a steam-jacket or other suitable means. When, after the lapse of about from two to six hours, the operation is completed, the contents, without being exposed, are discharged through a sluice-door, and run down a slight incline into another or settling tank, also constructed of slate or other suitable material. The first tank or converter (as we term it) is closed everywhere during the operation, so that the fumes may not escape except into the tower. At the end of the operation in the converter, steam is injected into the mass through an earthenware pipe, in order to blow off any of the lower oxides which may remain absorbed in the solution.

When, after the lapse of several hours, the mass has settled down in the settling-tank, the solution is drawn off by taps into a precipitating-tank, the residue is washed, and in the same manner the washings are drawn off into the precipitating-tank. Now, in this solution will probably be found some nitric acid. This tank, therefore, like the others, is closed, and we connect it with the tower.

In order to precipitate the gold, we add ferrous salt, or sulphurous acid, or other known reducing agent. This, in the first place, decomposes the nitric acid, if any, by becoming oxidized into ferric salt. The fumes or gases of all the remaining nitric acid then pass over into the tower, and are there reconverted and absorbed, as described. The ferrous salt then precipitates all the gold which is collected and fused. The whole of the gold will be thus extracted from the ore. Without any manipulation the mass falls down the slight incline into the settling-tank, whence, by turning a tap, the solution and washing, in turn, also fall into the settling-tank, where the gold is precipitated, as described, assisted by a jet of steam, and the solution runs off, leaving the gold. There being no escape, all the nitric acid used is recovered; the small quantity of hydrochloric acid given for the gold or other metal is all that is consumed.

If there be any copper, it will be found in solution with the gold, after precipitating which it is run over iron scrap, in the usual manner.

If there be silver it will be found as an insoluble chloride in the magma in the settling-tank. It is dissolved out by a hot solution of salt, which, in the same manner as with the gold, is run off, after settling, into another precipitating-tank, where the silver is precipitated by a bar of zinc. This salt solution is used over and over again. The magma is then taken out.

We claim as our invention—

1. The process herein described of absorbing peroxide of nitrogen and recovering nitric acid from its lower oxides, by the use in towers, or other suitable apparatus, of hot-water spray, substantially as hereinbefore described.

2. The process of reoxidizing and absorbing the lower oxides of nitrogen and of regaining the nitric acid, by the use in towers, or other suitable apparatus, of hot-water spray in combination with atmospheric air, as hereinbefore described.

3. The application of this process of using and recovering nitric acid to the treatment of metals and metallic ores, and to other industrial purposes, substantially as hereinbefore described.

In witness whereof we have signed our names to this specification in the presence of two subscribing witnesses.

BERNARD C. MOLLOY.
J. D. WARREN.

Witnesses:
W. I. WEEKS,
*Of 9 Gracechurch Street.*
CHAS. MILLS,
47 *Lincoln's Inn Fds., London.*